US009594978B2

(12) United States Patent
Silny et al.

(10) Patent No.: US 9,594,978 B2
(45) Date of Patent: Mar. 14, 2017

(54) TEMPORALLY ADAPTIVE PROCESSING

(71) Applicant: Raytheon Company, Waltham, MA (US)

(72) Inventors: John F. Silny, Playa Vista, CA (US); Mark T. Busch, Pls Vrds Pnsl, CA (US); Joe G. Shanks, San Diego, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/820,718

(22) Filed: Aug. 7, 2015

(65) Prior Publication Data
US 2017/0039446 A1 Feb. 9, 2017

(51) Int. Cl.
G06K 9/00 (2006.01)
G06K 9/46 (2006.01)
H04N 5/232 (2006.01)

(52) U.S. Cl.
CPC ....... *G06K 9/4671* (2013.01); *H04N 5/23229* (2013.01)

(58) Field of Classification Search
CPC .......................... G06K 9/4671; H04N 5/23229
See application file for complete search history.

(56) References Cited

U.S. PATENT DOCUMENTS

| | | | | |
|---|---|---|---|---|
| 5,014,131 A * | 5/1991 | Reed | ....................... | G01S 11/12 250/208.1 |
| 8,102,423 B2 * | 1/2012 | Cheng | .................. | G06K 9/0063 348/143 |
| 2014/0132789 A1 * | 5/2014 | Koyama | .................. | G06T 13/80 348/218.1 |

FOREIGN PATENT DOCUMENTS

EP 1486067 B1 12/2004

OTHER PUBLICATIONS

Beardsley, et al. "An effect of relative motion on trajectory discrimination," Dec. 29, 2006, Science Direct, 48 (2008), 1040-1052.*
International Search Report and Written Opinion from related PCT Application No. PCT/US2016/031123 issued Aug. 5, 2016.
Alireza Behrad, "A Robust Vision-Based Moving Target Detection and Tracking System," Jan. 31, 2001, XP055290695, retrieved from the internet: URL: https://www.researchgate.net/profile/Alireza_Behrad/ publication/228922058_A_eovuar_vision-based_moving_target_detection_and_tracking_system/inks/02bfe50d2e45e7d03b000000.pdf?origin=publication_detail.
I. Reed et al., "Optical Moving Target Detection with 3-D Matched Filtering Authors' addresses: I", IEEE Transactions on aerospace and electronic systems, Jul. 31, 1988, XP055290383, Retrieved from the internet: URL: http://eeexplore.ieee.org/ielx4/7/37700007174.pdf?tp=@amumber=7174&isnumber=377.

* cited by examiner

*Primary Examiner* — Shefali Goradia
(74) *Attorney, Agent, or Firm* — Burns & Levinson LLP; Joseph M. Maraia

(57) ABSTRACT

A method of image processing for finding a target in a scene includes receiving a series of images from a sensor and computing a background relative velocity in the series of images. The method further includes estimating a hypothesized target relative velocity of the target in the series of images. The method further includes computing a target revisit time based on a difference of the target relative velocity and the background relative velocity. The method further includes adjusting one or more of a frame capture rate or a frame processing rate based on the target revisit time.

20 Claims, 8 Drawing Sheets

300

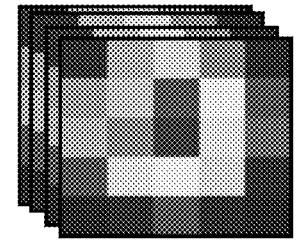
*
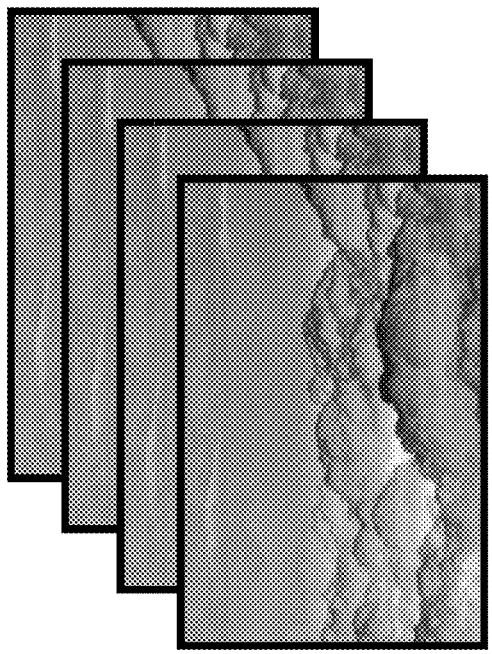
Apply VMF to Optimal Number of frames for increased SCNR
Fig. 4B 400

TEMPORALLY ADAPTIVE PROCESSING

BACKGROUND

Image analysis can be used to find a target and determine its velocity using a sensor and a computer. An example of a target is a human vehicle, missiles, aircraft, or other objects that can be captured by an imaging device or sensor. Typical image analysis systems find the target based on fixed frame data.

SUMMARY

In an embodiment, a method of image processing for finding a target in a scene includes, by one or more processors, receiving a series of images from a sensor and computing a background relative velocity and background power spectral density in the series of images. The method further includes hypothesizing a target relative velocity of the target in the series of images. The method further includes computing a target revisit time based on a difference of the hypothesized target relative velocity and the background relative velocity. The method further includes adjusting one or more of a frame capture rate or a frame processing rate based on the target revisit time.

In an embodiment, computing the background relative velocity in the series of images can be performed by a method of image analysis. In another embodiment, computing the background relative velocity can be performed by estimating the background relative velocity based on data such as an estimated or known range to the ground and sensor/platform ephemeris.

In an embodiment, hypothesizing the target relative velocity includes generating a bank of spatial-temporal matched filters based on an inputted range of possible target relative velocity values.

In another embodiment, the method includes capturing, with a sensor, the series of images, and outputting, from the sensor, the series of images to the one or more processors.

In yet another embodiment, the sensor is a passive electro-optical or infrared sensor.

In another embodiment, the method includes calculating a probability that the target is represented in one or more pixels of one of the series of images at a particular target relative velocity.

In another embodiment, the method includes segmenting each of the series of images into a plurality of sub-images. Each of the sub-images may overlap with any other sub-image. Computing the background relative velocity includes computing a plurality of background velocities and power spectral densities, each computed background relative velocity and power spectral density corresponding to one of the plurality of sub-images. Hypothesizing the target relative velocity includes hypothesizing one or more target velocities of a particular target corresponding to each of the sub-images. Computing the target revisit time includes computing a target revisit time for each sub-image. Adjusting the one or more of a frame capture rate or a frame processing rate includes adjusting the frame capture rate to be a greatest common factor of the target revisit times of each sub-image captured by a same sensor, and adjusting the frame processing rate to be the target revisit time corresponding to each sub-image.

In another embodiment, the method includes calculating a multiplier based on the background power spectral density. Computing the revisit time includes calculating the product of the multiplier and the inverse of the magnitude difference between the hypothesized target relative velocity and background relative velocity.

In still another embodiment, a computer implemented method of image processing for finding a target in a scene comprises: receiving with a processor a series of images from a sensor, computing a background relative velocity in the series of images, hypothesizing a target relative velocity of a target in the series of images, computing a target revisit time based on a difference of the hypothesized target relative velocity and the background relative velocity, adjusting one or more of a frame capture rate or a frame processing rate based on a target revisit time, creating one or more matched filters based on the hypothesized target relative velocity(ies) and associated optimal revisit time(s), and applying each of the matched filters to the series of images to produce scored images which are thresholded to detect targets. The method may further comprise displaying the results or providing the results to another computer for further processing.

In another embodiment, a system for image processing for finding a target in a scene includes one or more processors in communication with a sensor. The one or more processors are adapted to receive a series of images from a sensor and compute a background relative velocity in the series of images, hypothesize a target relative velocity of a target in the series of images, compute a target revisit time based on a difference of the hypothesized target relative velocity and the background relative velocity, adjust one or more of a frame capture rate or a frame processing rate based on the target revisit time, create one or more matched filters based on the hypothesized target relative velocity(ies) and associated optimal revisit time(s), and apply each of the matched filters to the series of images to produce scored images which are thresholded to detect targets. Results can be displayed to a human user or provided to another computer for further processing.

In another embodiment, the one or more processors are further adapted to generate a bank of matched filters based on the revisit time, the target template, and multiple hypothesized target relative velocities. The bank of matched filters can be implemented in parallel for low latency processing to detect targets.

In an embodiment, the sensor can be configured to capture the series of images and output the series of images to the one or more processors. The sensor can be a passive electro-optical or infrared sensor.

In another embodiment, the one or more processors can be further adapted to calculate probability that the target is represented in a pixel of one of the series of images at a particular target relative velocity.

In another embodiment, the one or more processors can be further adapted to segment each of the series of images into a plurality of sub-images. Each of the plurality of sub-images may overlap with any of the plurality of sub-images. Computing the background relative velocity and background power spectral density includes computing a plurality of background velocities and power spectral densities for the sub-images, with each background velocity and power spectral density corresponding to a sub-image. Estimating the hypothesized target relative velocity includes hypothesizing a particular target relative velocity of a particular target corresponding to each sub-image. Computing the target revisit time includes computing a target revisit time for each sub-image. Adjusting the one or more of a frame capture rate or a frame processing rate includes adjusting the frame capture rate to be a greatest common factor of the target revisit times of each sub-image captured by a same sensor, and adjusting the frame processing rate to be the target revisit time corresponding to each sub-image.

In another embodiment, the one or more processors are further adapted to calculate a multiplier based on the background power spectral density and compute the revisit time by calculating the product of the multiplier and the inverse of the magnitude difference of the hypothesized target relative velocity and background relative velocity.

In an embodiment, a non-transitory computer-readable medium having computer-readable program codes embedded thereon includes instructions for causing a processor to execute a method of image processing for finding a target in a scene that, when executed by one or more processors, cause the one or more processors to receive a series of images from a sensor and compute a background relative velocity and power spectral density in the series of images, estimate a hypothesized target relative velocity of a target in the series of images, compute a target revisit time based on a difference of the hypothesized target relative velocity and the background relative velocity, and adjust one or more of a frame capture rate or a frame processing rate based on the target revisit time.

In another embodiment, estimating the hypothesized target relative velocity includes generating a bank of matched filters based on the revisit time, the target template, and multiple hypothesized target relative velocities. The bank of matched filters can be implemented in parallel for low latency processing to detect targets.

In another embodiment, the non-transitory computer-readable medium further causes the processors to capture, with a sensor, the series of images and output the series of images to the one or more processors. The sensor can be a passive electro-optical or a passive infrared sensor.

In another embodiment, the non-transitory computer-readable medium further causes the processors to calculate a probability that the target is present in a pixel (or group of pixels) within of one of the series of images, and moving with a particular target relative velocity.

In another embodiment, the non-transitory computer-readable medium further causes the processors to segmenting each of the series of images into a plurality of sub-images. Each of the sub-images may overlap with any other sub-image. Computing the background relative velocity and background power spectral density includes computing a plurality of background velocities and power spectral densities for each sub-image. Each computed background relative velocity and power spectral density corresponding to one of the plurality of sub-images. Estimating the hypothesized target relative velocity includes estimating a particular target relative velocity of a particular target corresponding to each sub-image. Computing the target revisit time includes computing a target revisit time for each sub-image. Adjusting the one or more of a frame capture rate or a frame processing rate includes adjusting the frame capture rate to be a greatest common factor of the target revisit times of each sub-image captured by a same sensor, and adjusting the frame processing rate to be the target revisit time corresponding to each sub-image.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIGS. 4A-B form a flow diagram illustrating a process employed by an embodiment of the present technology.

DETAILED DESCRIPTION

A detailed description of example embodiments follows.

In an embodiment of the present technology, an automated system senses images using a sensor, and processes the images to detect targets. Examples of targets can be human vehicles, such as aircraft, but other vehicles and targets can be detected as well. In an embodiment of the present technology, the system analyzes clutter data (e.g., the background of the image) and uses hypothesized target data (e.g., an estimate of the target velocity) to find an optimal revisit time that provides a higher probability of target detection at any given false alarm rate. For example, in a scene that is moving slowly relative to the target, the system must wait longer for the target to separate from the background for improved detection performance. In a scene that is moving fast relative to the target, the system does not need to wait as long to achieve improved detection performance. The optimal revisit time is used to optimally adjust the sensor's frame capture rate, and/or to optimally adjust the frame processing rate. Adjusting the frame capture rate or frame processing rate allows for improved target detection performance relative to a non-optimal revisit time. Previous systems use one fixed, unadjustable revisit time for all captured images, which prevents the improvement in target detection by the present technology. The present technology improves the result by considering how the spatial clutter of the scene de-correlates with the target position across a series of images in time to compute an optimal revisit time, which increases target detection performance (higher probability of detection for a fixed false alarm rate).

Figure 1:
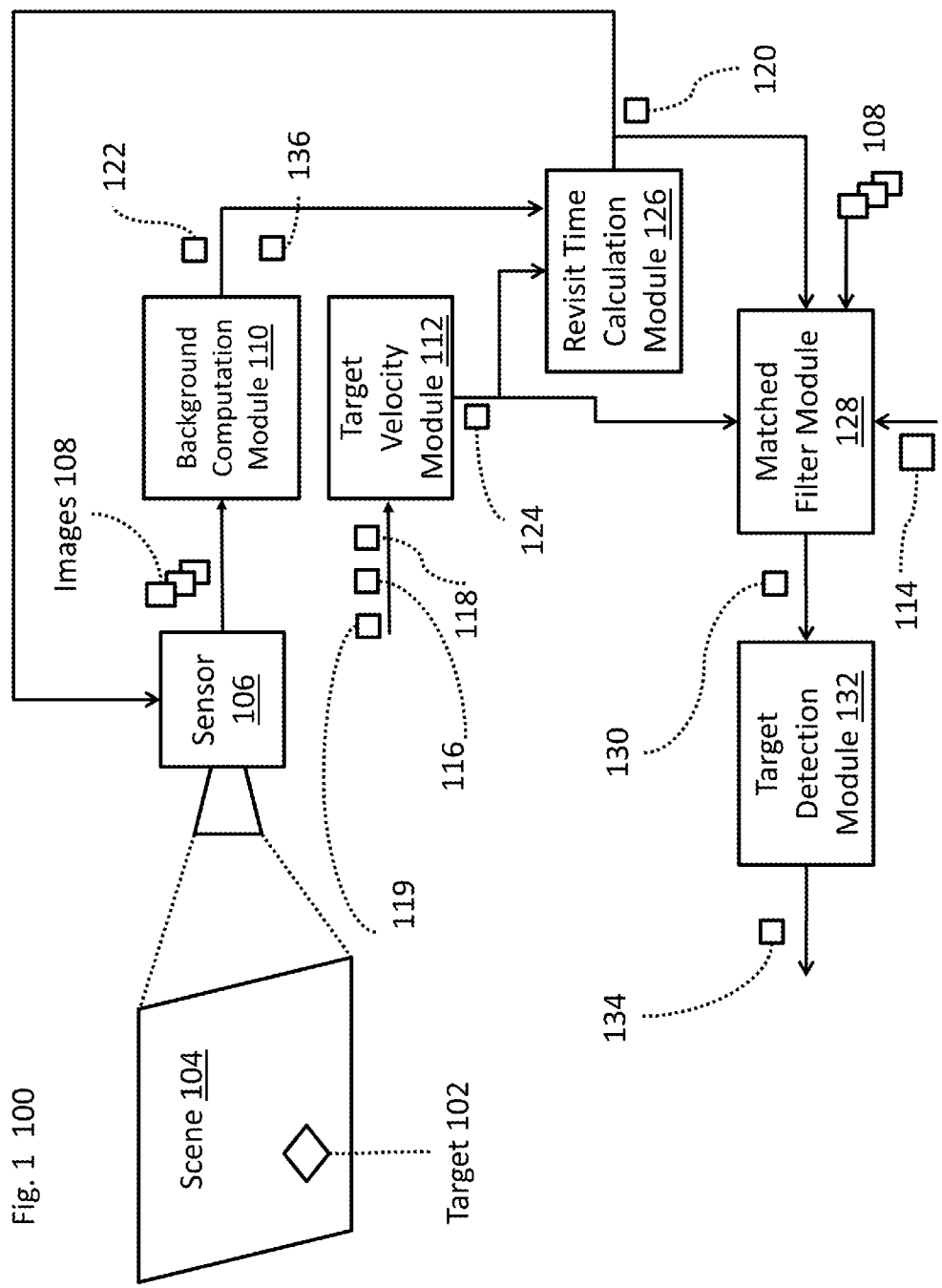
FIG. 1 is a block diagram illustrating an example embodiment of a temporally adaptive processing system employed by the present technology.

FIG. 1 is a block diagram 100 illustrating an example embodiment of a temporally adaptive processing system employed by the present technology. A sensor 106 is employed to capture a scene 104 that may have a target 102 therein. The sensor 106 can be a remote sensor. The sensor 106 can be a passive sensor, which is a sensor that captures the scene without emitting any energy. The sensor 106 can either scan the scene 104 or capture the scene 104 using staring, or collect scene 104 using a combination of the two methods (e.g., step-stare imaging).

The scene 104 can have a background that has clutter, and may or may not have a target 102. Applications of the present technology, in general, analyze images 108 of the scene 104 captured by the sensor 106 to determine whether a particular target (represented in a target template 114) is in the images 108. The scene can also have a foreground, which is also a form of clutter.

A background computation module 110 analyzes the images 108 to generate a background relative velocity 122 and a background power spectral density (PSD) 136. The background PSD 136 is a power spectral density of the background image, which quantifies the spatial clutter within the images 108. PSD is commonly used in signal processing and for images is usually represented as a two-dimensional (2D) function of horizontal spatial-frequency ($f_x$) and vertical spatial frequency ($f_y$). PSD can be analytic, for modeling and/or simulation, or measured from an image. A person of ordinary skill in the art can recognize there are standard techniques used to summarize variation of a background image along a length scale. For example, one technique determines whether the image has a log of brightness change over small distances (e.g., similar to a checkerboard) or a slow variation (e.g., a blended change from dark to bright across the image). In embodiments of the present invention, the background PSD 136 can be used to optimize the spatial-clutter suppression, by working with parameters derived from PSD (e.g., a "Correlation-Length", or a "Roll-off exponent" with form).

In an embodiment, the background computation module 110 computes an image gradient of successive images of the set of images 108. An image gradient is a directional change in intensity or color in an image. Using the computed image gradient, the background computation module 110 can calculate an optical flow field. The optical flow field can then represent a background relative velocity 122 at each pixel of each change between successive images. Objects in the field can be moving because of, for example, movement of the objects themselves in the background, movement of objects in the foreground, relative motion of the sensor with respect to both the background and foreground, or a parallax effect due to the sensor moving. Alternatively, the background computation module 110 can calculate the background relative velocity 122 based on a known or estimated distance from the sensor 106 to the background (e.g., the ground) independent of the set of images 108 themselves, or other ways to calculate the background relative velocity 122 based on other known variables independent of the set of images 108.

In parallel (or in other embodiments, in sequence), a target relative velocity module 122 generates one or more hypothesized target relative velocities 124. The target relative velocity module 112 receives a minimum possible target relative speed 116, a maximum possible target relative speed 118, and possible target orientation angles within the sensor coordinate frame 119. The hypothesized target relative velocity 124 (a vector with magnitude and direction) is generated by combining a speed hypothesis (between the minimum possible target relative speed 116 and maximum possible target speed 118) with an angle direction hypothesis (based on the possible target angles 119). In practice, multiple target velocities are hypothesized since the true target velocity is unknown. The target velocity is a vector that represents both the hypothesized speed (magnitude) and direction of the target. There are many possible target velocities, so each must be hypothesized separately The target relative velocity module 112 generates the hypothesized target relative velocity(ies) 124 based on the minimum possible target relative speed 116, maximum possible target relative speed 118, and possible target angles 119.

A revisit time calculation (RTC) module 126 receives the background relative velocity 122, the background PSD 136, and the hypothesized target relative velocity(ies) 124. The RTC module can calculate an optimal revisit time 120 for each combination of background relative velocity 122, background PSD 136, and hypothesized target velocity(ies) 124. The RTC module 126 can calculate the relative velocity of the target by finding the magnitude of the difference between the background relative velocity 122 and the hypothesized target relative velocity 124, which can be represented as: $\|\vec{v}_\Delta\|$ (in pixels/second). In embodiments of the present technology, for a Nyquist sampled optical system (e.g., $Q=(\lambda F/\#)/p=2$, in which $\lambda$ is the wavelength, $F/\#$ is the focal length ratio, and p is the imaging array pixel pitch) a minimum frame separation time, T, must be greater than $T_{min}$, to realize any detection performance benefit. This can be expressed as:

$$T > T_{min} = \frac{1}{2}\|\vec{v}_\Delta\|^{-1}$$

Such a relationship implies that short frame separation times help detect targets when the magnitude of the relative hypothesized target relative velocity is large. In other words, the target revisit time is inversely proportional to the magnitude of the difference between the hypothesized target relative velocity and background relative velocity. An optimal frame separation time can be found by the following relationship:

$$T_{optimal} = kT_{min} = k\frac{1}{2}\|\vec{v}_\Delta\|^{-1}$$

While k can be any value greater than or equal to 1, in typical embodiments it ranges from 3-8. The preferred value of k can be computed by analyzing the shape of the background PSD 136.

Based on the calculated k, the RTC module 126 can calculate an optimal revisit time 120 (e.g., $T_{optimal}$).

The sensor 106 can also adjust its frame capture rate based on the calculated target revisit time 126. In one embodiment, the frame capture rate can be proportional to the optical target revisit time 126. In other embodiments, the frame capture rate of the sensor 106 may be fixed, or for other reasons may not be ideal to adjust. In these embodiments, the frame capture rate of the sensor 106 may stay fixed, but the system may process images at a rate proportional to the optimal target revisit time 126 or using a sequence of images 108 collected over a period of time no shorter than the optimal target revisit time 126. When a spatial-temporal Matched Filter (e.g., a Velocity Matched Filter applied over multiple frames) is applied to the optimal number of frames, the result is increased target detection performance (higher probability of detection at a fixed false alarm rate). Each hypothesized filter produces a unique matched filter template, which is then used to compute the optimal revisit time associated with each matched filter template.

A matched filter module 128 creates and applies at least one matched filter to produce at least one matched filter score image(s) 130 based on the hypothesized target relative velocity(ies) 124, the optimal revisit time(s) 120, and the target template 114. Filters have to be created to estimate the speed of the target object given a specified range of velocities. In one embodiment, the matched filters are multi-frame velocity matched filters (VMFs) that represent the target's spatial extent and changing position over a sequence of frames. In practice, multiple matched filters need to be created since the true velocity of the target is unknown. Each created matched filter represents a different hypothesis, or guess, of the target relative velocity. Each of the matched filters is applied to produce a corresponding score image 130.

The matched filter(s) within the module 128 can be applied as a sequence of filters or bank of parallel filters to search for the target object. The filters of the bank of filters range from searching from the object having the minimum possible target speed 116 to having the maximum possible target speed 118, and with the possible target orientation angles 119. The bank of filters can check for velocities at varying granularities between the minimum possible target speed 116 and maximum possible target speed 118, and at varying angles as specified in by the possible target orientation angles 119. For example, a bank of filters searching for a target being between 10 miles per hour (MPH) and 100 MPH and at 24 uniformly spaced possible angles (i.e., 0 degrees to 345 degrees in 15 degree steps) could search at a granularity of 10 MPH, resulting in 240 total filters in the bank (i.e., filters for 10 MPH at 0 degrees, 10 MPH at 15 degrees, . . . , 10 MPH at 345 degrees, 20 MPH at 0 degrees, . . . , 100 MPH at 345 degrees).

The matched filter module 128 provides the matched filter score image(s) 130 to the target detection module 132 to produce detected target information 134 (e.g., a detected target location, velocity, and confidence level) by thresholding each matched filter score image 130 and/or combining information across score images produced from competed matched filter hypotheses. Pixels with score values greater than or equal to the threshold are declared targets, while pixels with score values less than the threshold are declared non-targets. The detection threshold can be determined in multiple ways. For example, one method is a constant false alarm rate (CFAR) detector, in which the statistics of the score image(s) are analyzed to determine a threshold that produces a constant number of detections per unit time. If no targets are present within the scene, the constant number of detections per unit time corresponds directly to the constant false alarm rate. The target detection module 132 can output the target information 134 to a display, or to another machine or module configured to employ the target information 134.

Prior systems have employed a spatial matched filter based on a single frame. These systems can generate false alarms, as they do not incorporate the temporal aspect of the scene, and only analyze one frame. Other systems also employ a spatial/temporal matched filter, correlating a fixed number of frames or a fixed revisit time. In other words, these systems are not temporally adaptive. In an embodiment of the present technology, however, a system computes the background relative velocity of a scene in spatial blocks using optical flow fields. The spatial blocks can be a pixel or any other granularity. The system estimates/hypothesizes a hypothesized target relative velocity and further calculates a relative target relative velocity by finding the difference of the estimated target relative velocity and the background relative velocity. Based on the relative target relative velocity, the system can compute an optimal target revisit time for highest signal-to-clutter-and-noise ratio (SCNR) gain. The system of the present technology achieves variable target revisit time using an adaptive number of temporal frames (e.g., adjusting frame capture rate) and/or temporal frame spacing (e.g., adjusting frame processing rate). The high SCNR produced by embodiments of the present technology increases target detection confidence for a fixed false alarm rate, or reduces the false alarm rate at a fixed target detection confidence level, or a combination of both (higher detection confidence with lower false alarm rate).

Figure 2:
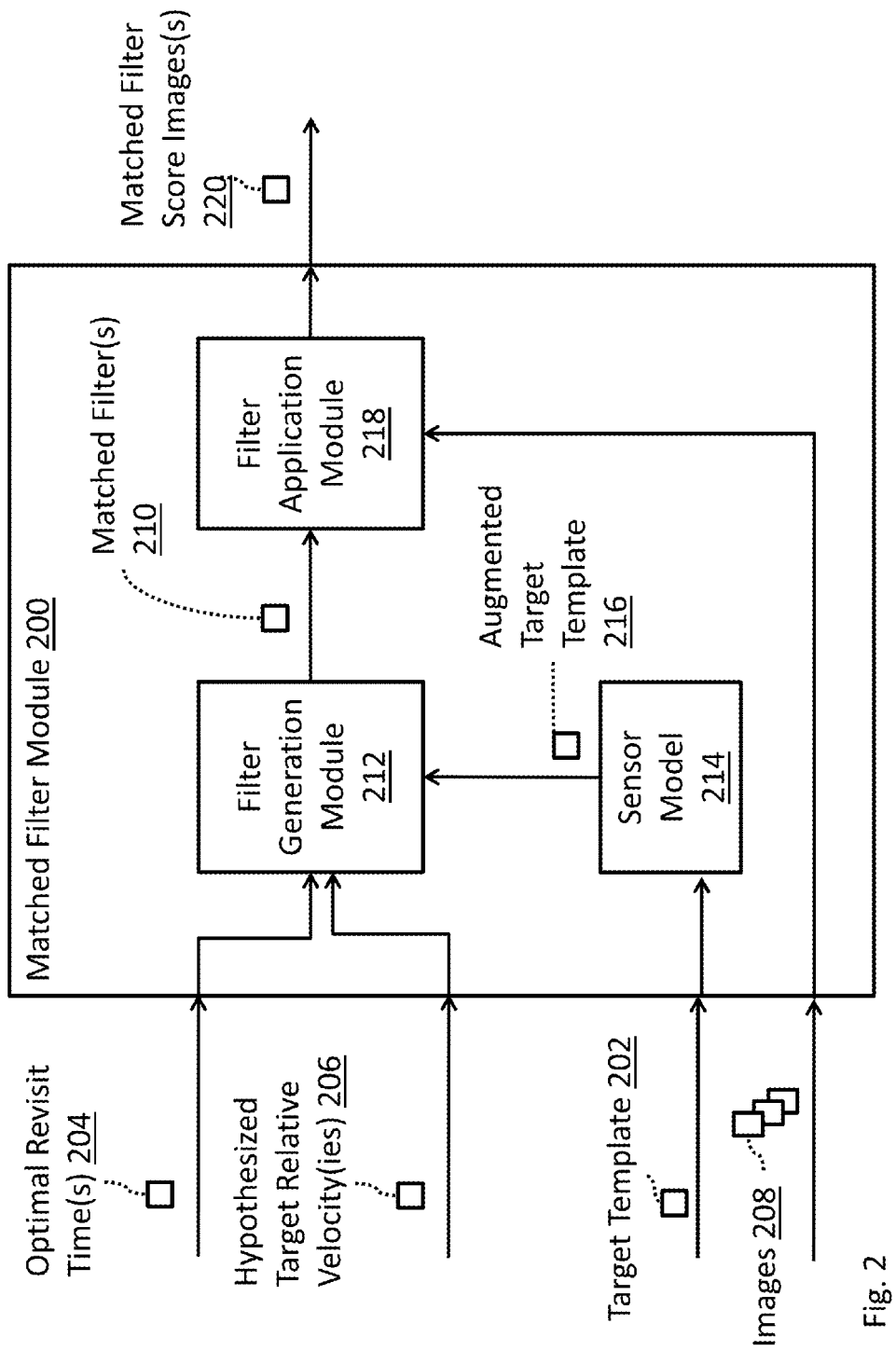
FIG. 2 is a block diagram illustrating an example embodiment of a matched filter creation module employed by the present technology.

In another embodiment, the system can divide the series of images into sub-images, and perform the same processing on each of the sub-images. For example, the system can divide the series of images into four quadrants, and perform the temporal adaptive processing of the present technology on each of the four quadrants. Further, the system can divide the series of images into a sub-images defined by any polygonal shape, non-polygonal shape, or by pixel, and further can be of any granularity. FIG. 2 is a block diagram of a matched filter module 200 illustrating an exemplary embodiment of the Matched Filter Module 128 of FIG. 1. Sensor model 214 within module 200 receives a target template 202, and generates an augmented target template 216 therefrom. In the illustrative embodiment, Target Template 202 may comprise a template of what the object looks like that is used in the matched filter. Sensor Model 214 may comprise a model of the imaging sensor that transforms the target template into an Augmented Target Template 216, which is a representation of the target as it would appear in image sensor data. A filter generation module 212 within module 200 receives an optimal revisit time 204, the hypothesized target relative velocity 206, and the automated target template 216 and generates a corresponding bank of matched the filters 210. The bank of filters 210 includes filters 208*a-n*. For example, filter 208*a* can be a filter corresponding to the minimum target relative velocity 204 and filters 208*n* can be a filter corresponding to the maximum target relative velocity 206. Filters 208*b-m* represent target velocities in between the minimum target relative velocity and maximum target relative velocity. The spacing of the target velocities represented by filters 208*b-m* can be varied or of any granularity. A filter application module 218 within module 200 receives the match filters 210 and images 208 and generates matched filter score images 220 which serve as the output of module 200.

Figure 3:
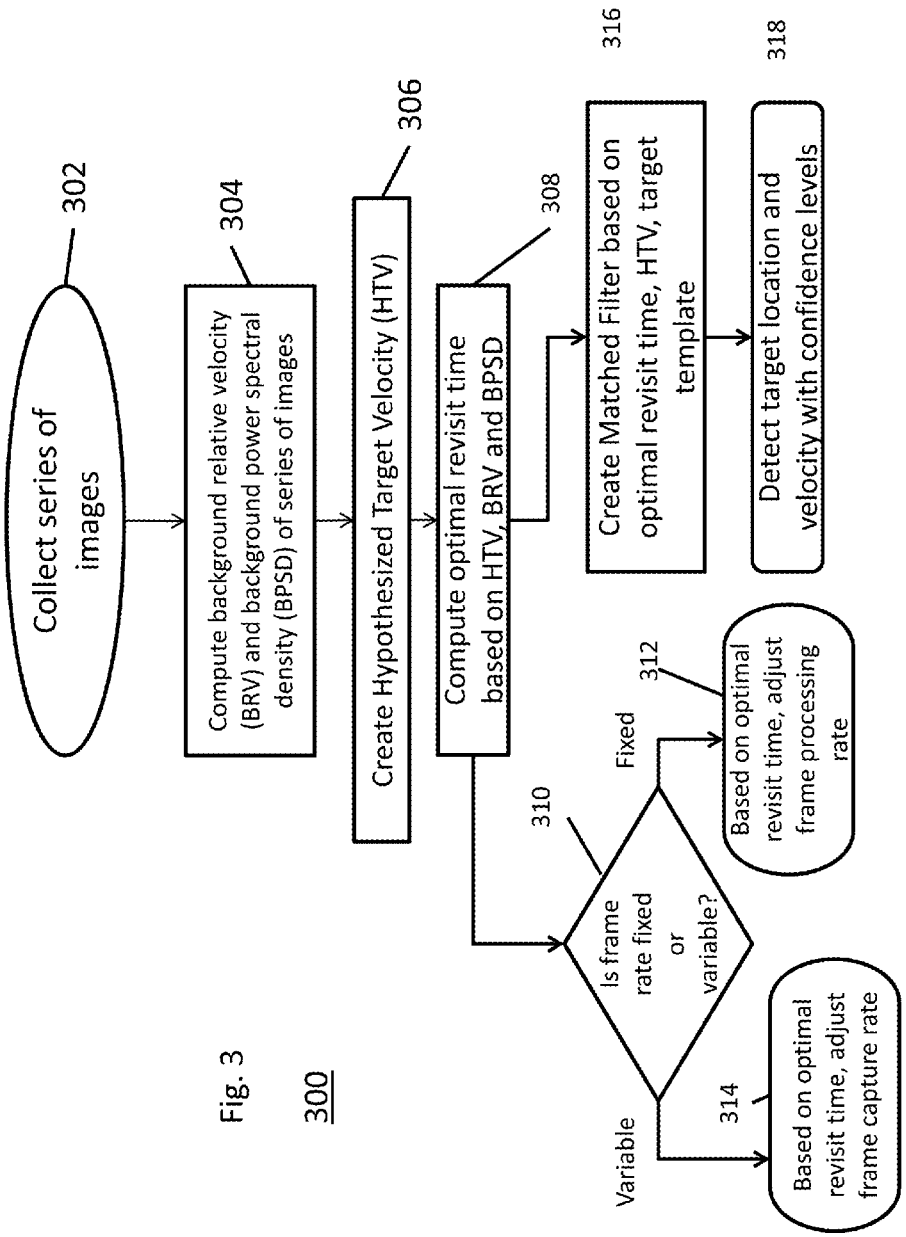
FIG. 3 is a flow diagram illustrating a process employed by an embodiment of the present technology.

FIG. 3 is a flow diagram 300 illustrating a process employed by an embodiment of the present technology. The process first collects a series of images (302). The process then computes a background relative velocity and a background PSD of the series of images using image gradients and optical flow fields (304). The process then estimates a hypothesized target relative velocity based on an object template, and a minimum target velocity and a maximum target velocity (306). The process then computes an optimal revisit time based on the hypothesized target relative velocity, the background relative (308). The process then determines whether the frame rate is fixed or variable (310). If the frame rate is fixed, the process, based on the optimal revisit time, adjusts the frame processing rate (312). If the frame rate is variable, based on the optimal revisit time, adjusts the frame capture rate of the sensor (314).

However, after computing the optimal revisit tome (308), the process also creates matched filter(s) based on the optimal revisit time and the hypothesized target velocity (316). Then, the process detects the target location, velocity, and confidence level and outputs the information (318).

Figure 4A:
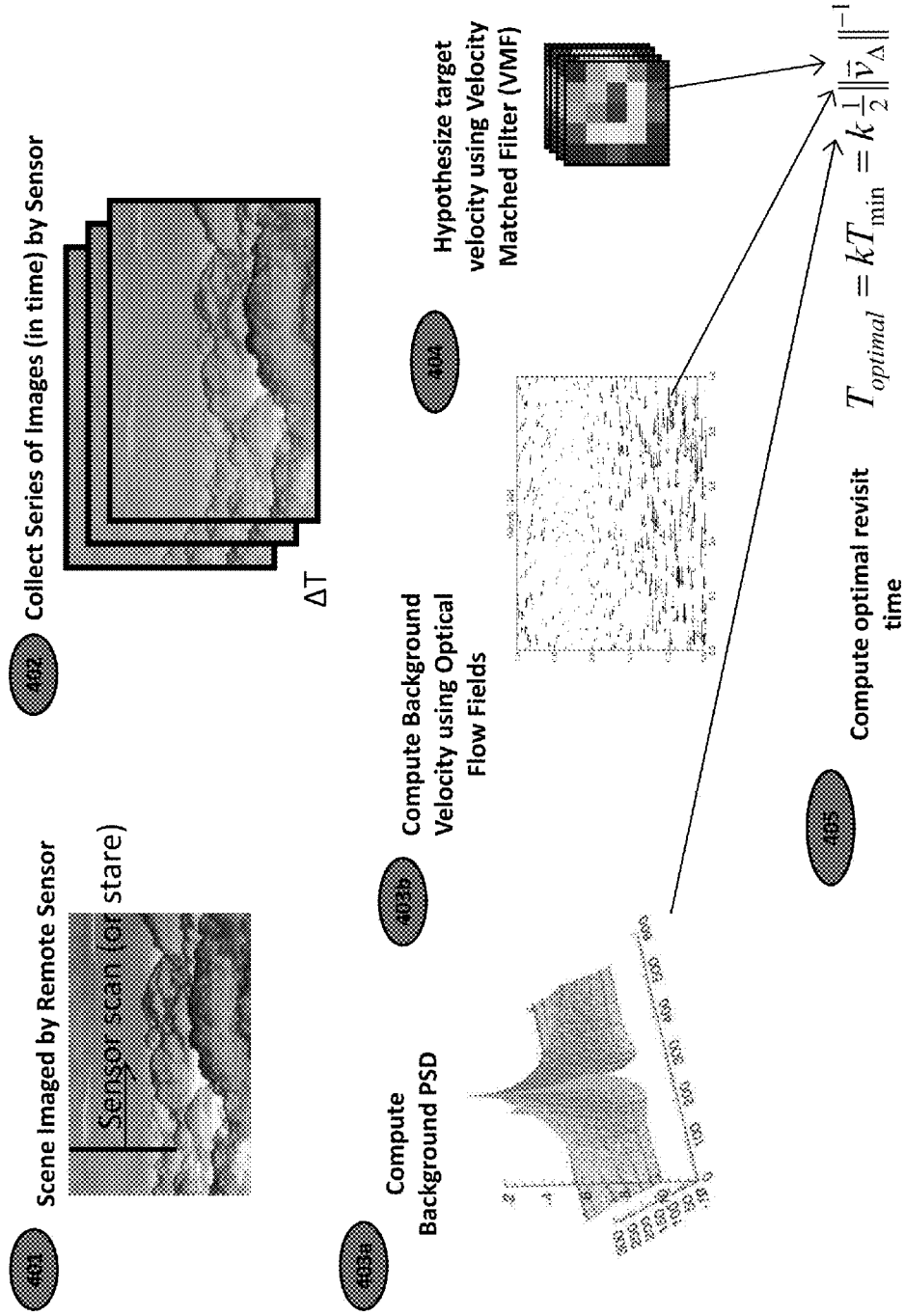

FIG. 4 is a flow diagram 400 illustrating a process employed by an embodiment of the present technology. A remote sensor images a scene (401) and collects a series of images in time/temporally (402). A processor then computes a background PSD (403*a*), background relative velocity of the images using image gradients and Optical Flow Fields (403*b*) and hypothesizes a hypothesized target relative velocity using a relative velocity matched filter (VMF) (404). The processor then computes an optimal revisit time (405) using the computed background PSD (403*a*), background relative velocity (403*b*) and hypothesized target relative velocity (404) to form a relative target relative velocity, $\|\vec{v}_A\|$. The system is then applies the VMF to the optimal number of frames based on the optimal revisit time for an increased gain (406).

Figure 5:
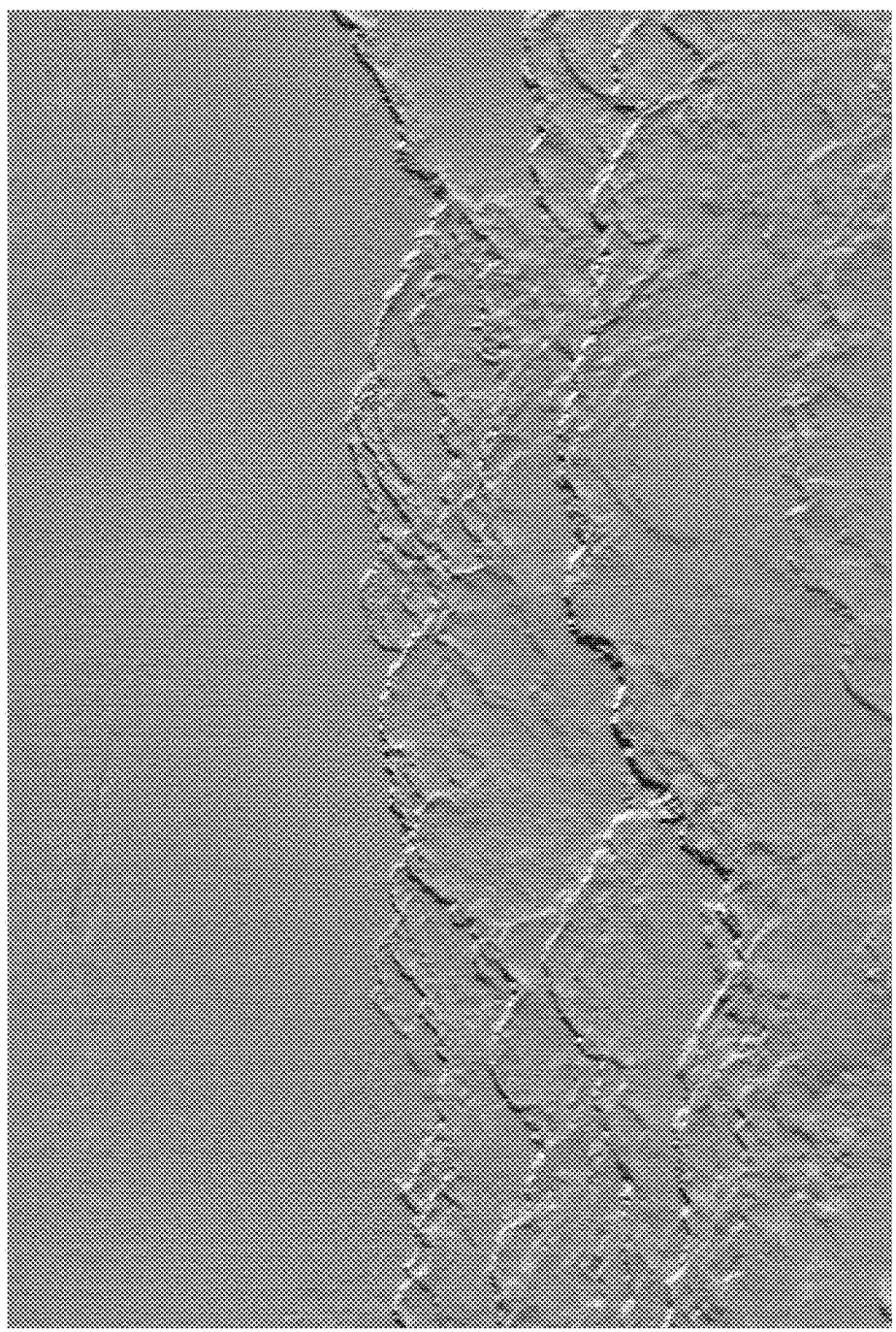
FIG. 5 is a graphical representation of an image gradient.

FIG. 5 is a graphical representation of an image gradient 500. The image gradient 500 shows a directional change in intensity or color in an image. The image gradient 500 can be used to inform an optical flow field, which is shown in more detail in FIG. 6. The image gradient 500 can be calculated based on change in intensity in pixel values in a particular direction. In this example, the image gradient 500 is based on the change in intensity in a horizontal direction, however, in other embodiments, a vertical gradient can be calculated. In an embodiment, lighter pixels (e.g., gray pixels) have a small gradient, and darker pixels (e.g., black pixels) have a large gradient.

Figure 6:
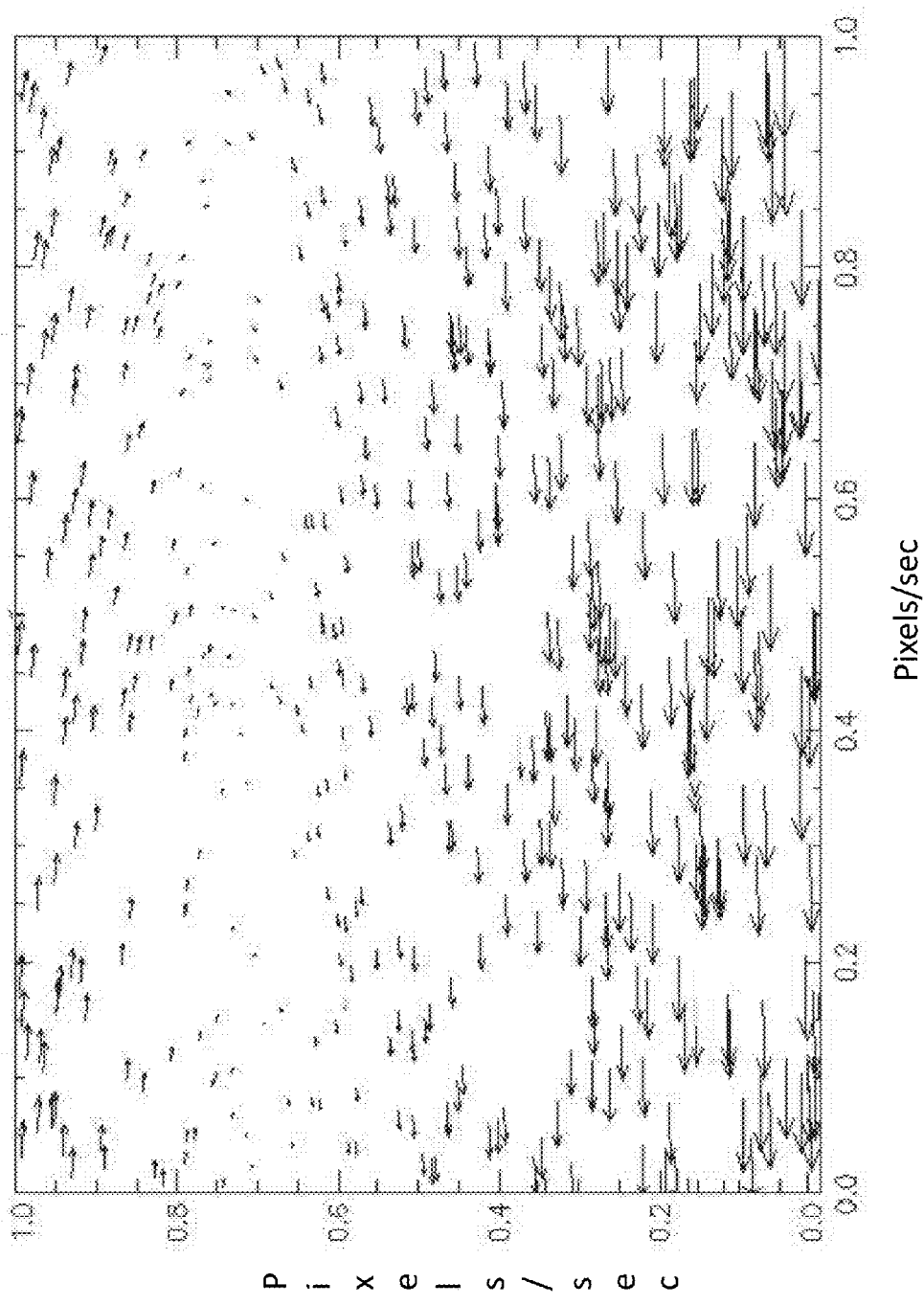
FIG. 6 is a graphical representation of an optical flow field.

FIG. 6 is a graphical representation of an optical flow field 600. The optical flow field can be calculated from the image gradient (e.g., image gradient 500 of FIG. 5). The optical flow field shows, at each pixel, the speed of movement of that pixel from one frame to the next (e.g., in pixels/second). The optical flow field shows the speed of movement of each pixel with a two dimensional vector, factoring in both the vertical and horizontal movement of that pixel from one frame to the next frame.

Figure 7:
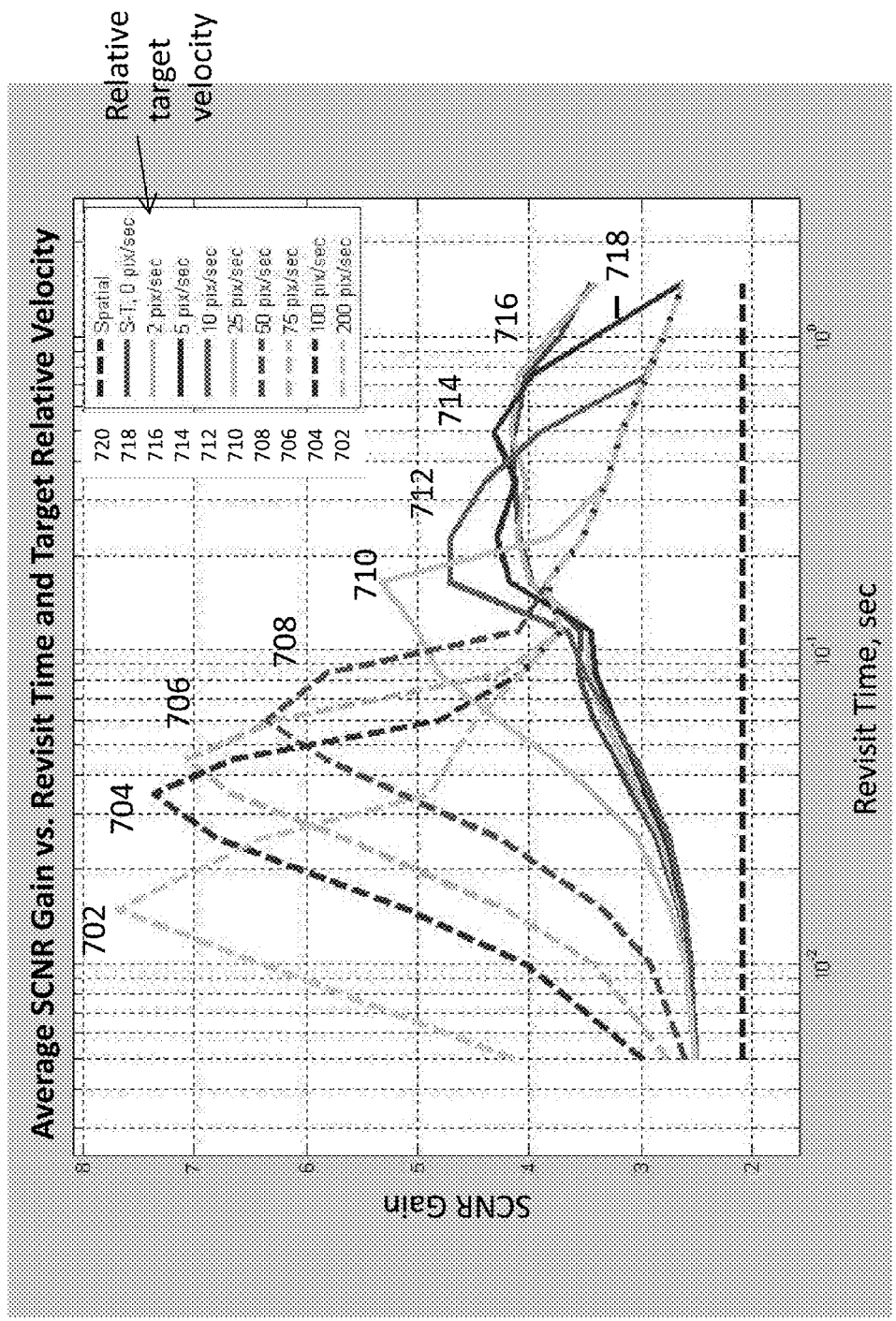
FIG. 7 is a graph illustrating advantages of embodiments of the present technology.

FIG. 7 is a graph 700 illustrating advantages of embodiments of the present technology. The graph 700 plots average SCNR gain against revisit time for different relative target velocities. The graph 700 plots SCNR gain for a spatial-temporal matched filter for target relative velocities of 200 pixels/second (702), 100 pixels/second (704), 75 pixels/second (706), 50 pixels/second (708), 25 pixels/second (710), 10 pixels/second (712), 5 pixels/second (714), 2 pixels/second (716), and 0 pixels/second (718). The graph also shows the results for a spatial matched filter (720).

The graph 700 shows that each relative target relative velocity has a peak SCNR gain at a different revisit time. For example, a relative target relative velocity of 200 pixels/second (702) has a peak SNR gain with a revisit time just over 1/100 seconds. A relative target relative velocity of 25 pixels/second (712) has a peak SNR rain at just over 1/10 seconds. A person of ordinary skill in the art can see that using one revisit time for both relative target velocities may result in a high SCNR gain for one of the target velocities, but not the other relative target relative velocity. The present technology temporally adapts to provide revisit times for different relative target velocities and therefore provides ideal SNR gain for all relative target velocities.

The teachings of all patents, published applications and references cited herein are incorporated by reference in their entirety.

While this technology has been particularly shown and described with references to example embodiments thereof, it will be understood by those skilled in the art that various changes in form and details may be made therein without departing from the scope of the embodiments encompassed by the appended claims.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of image processing for finding a target in a scene comprising:
   by one or more processors:
   receiving a series of images from a sensor;
   computing a background relative velocity in the series of images;
   hypothesizing a target relative velocity of the target in the series of images;
   computing a target revisit time based on a difference of the hypothesized target relative velocity and the background relative velocity; and
   adjusting one or more of a frame capture rate of the sensor or a frame processing rate based on the target revisit time.

2. The method of claim 1, wherein estimating the hypothesized target relative velocity includes:
   generating a bank of matched filters based on an inputted range of possible hypothesized target relative velocity values.

3. The method of claim 1, further comprising:
   capturing, with the sensor, the series of images; and
   outputting, from the sensor, the series of images to the one or more processors.

4. The method of claim 3, further comprising:
   applying each of the matched filters to the series of images to produce scored images which are thresholded to detect targets.

5. The method of claim 1, further comprising calculating a probability that the target is represented in a pixel of one of the series of images at a particular target relative velocity.

6. The method of claim 1, further comprising:
   segmenting each of the series of images into a plurality of sub-images, where each of the plurality of sub-images may overlap with another of the plurality of sub-images;
   wherein computing the background relative velocity includes computing a plurality of background velocities, each of the plurality of background velocities corresponding to each sub-image;
   wherein estimating the hypothesized target relative velocity includes estimating a particular target relative velocity of a particular target corresponding to each sub-image;
   wherein computing the target revisit time includes computing a target revisit time for each sub-image; and
   wherein adjusting the one or more of a frame capture rate or a frame processing rate includes adjusting the frame capture rate to be a greatest common factor of the target revisit times of each sub-image captured by a same sensor, and adjusting the frame processing rate to be the target revisit time corresponding to each sub-image.

7. The method of claim 1, further comprising:
   calculating a multiplier based on the background relative velocity;
   wherein computing the hypothesized target relative velocity includes calculating the product of the multiplier and the difference of the target relative velocity and background relative velocity.

8. A system for image processing for finding a target in a scene comprising:
   one or more processors in communication with a sensor, the one or more processors adapted to:
   receive a series of images from the sensor;
   compute a background relative velocity in the series of images;
   estimate a hypothesized target relative velocity of a target in the series of images;
   compute a target revisit time based on a difference of the hypothesized target relative velocity and the background relative velocity; and
   adjust one or more of a frame capture rate or a frame processing rate based on the target revisit time.

9. The system of claim 8, wherein the one or more processors are further adapted to generate a bank of matched filters based on an inputted range of possible target relative velocity values.

10. The system of claim 8, wherein the sensor is configured to capture the series of images and output the series of images to the one or more processors.

11. The system of claim 10, wherein the sensor is a passive electro-optical or infrared sensor.

12. The system of claim 8, wherein the one or more processors are further adapted to calculate probability that the target is represented in a pixel of one of the series of images at a particular target relative velocity.

13. The system of claim 8, wherein the one or more processors are further adapted to:
segment each of the series of images into a plurality of sub-images, where each of the plurality of sub-images may overlap with another of the plurality of sub-images;
wherein computing the background relative velocity includes computing a plurality of background velocities, each of the plurality of background velocities corresponding to each sub-image;
wherein estimating the hypothesized target relative velocity includes estimating a particular target relative velocity of a particular target corresponding to each sub-image;
wherein computing the target revisit time includes computing a target revisit time for each sub-image; and
wherein adjusting the one or more of a frame capture rate or a frame processing rate includes adjusting the frame capture rate to be a greatest common factor of the target revisit times of each sub-image captured by a same sensor, and adjusting the frame processing rate to be the target revisit time corresponding to each sub-image.

14. The system of claim 8, wherein the one or more processors are further adapted to calculate a multiplier based on the background relative velocity and compute the hypothesized target relative velocity by calculating the product of the multiplier and the difference of the target relative velocity and background relative velocity.

15. A non-transitory computer-readable medium having computer-readable program codes embedded thereon including instructions for causing a processor to cause the one or more processors to:
receive a series of images from a sensor;
compute a background relative velocity in the series of images;
estimate a hypothesized target relative velocity of a target in the series of images;
compute a target revisit time based on a difference of the hypothesized target relative velocity and the background relative velocity; and
adjust one or more of a frame capture rate or a frame processing rate based on the target revisit time.

16. The non-transitory computer-readable medium of claim 15, wherein estimating the hypothesized target relative velocity includes:
generating a bank of matched filters based on an inputted range of target relative velocity values.

17. The non-transitory computer-readable medium of claim 15, further comprising:
capturing, with the sensor, the series of images;
outputting, from the sensor, the series of images to the one or more processors.

18. The non-transitory computer-readable medium of claim 17, wherein the sensor is a passive electro-optical or infrared sensor.

19. The non-transitory computer-readable medium of claim 15, further comprising calculating a probability that the target is represented in a pixel of one of the series of images at a particular target relative velocity.

20. The non-transitory computer-readable medium of claim 15, further comprising:
segmenting each of the series of images into a plurality of sub-images, where each of the plurality of sub-images may overlap with another of the plurality of sub-images;
wherein computing the background relative velocity includes computing a plurality of background velocities for each sub-image, each of the plurality of background velocities corresponding to each sub-image;
wherein estimating the hypothesized target relative velocity includes estimating a particular target relative velocity of a particular target corresponding to each sub-image;
wherein computing the target revisit time includes computing a target revisit time for each sub-image; and
wherein adjusting the one or more of a frame capture rate or a frame processing rate includes adjusting the frame capture rate to be a greatest common factor of the target revisit times of each sub-image captured by a same sensor, and adjusting the frame processing rate to be the target revisit time corresponding to each sub-image.

* * * * *